United States Patent Office 2,761,713
Patented Sept. 4, 1956

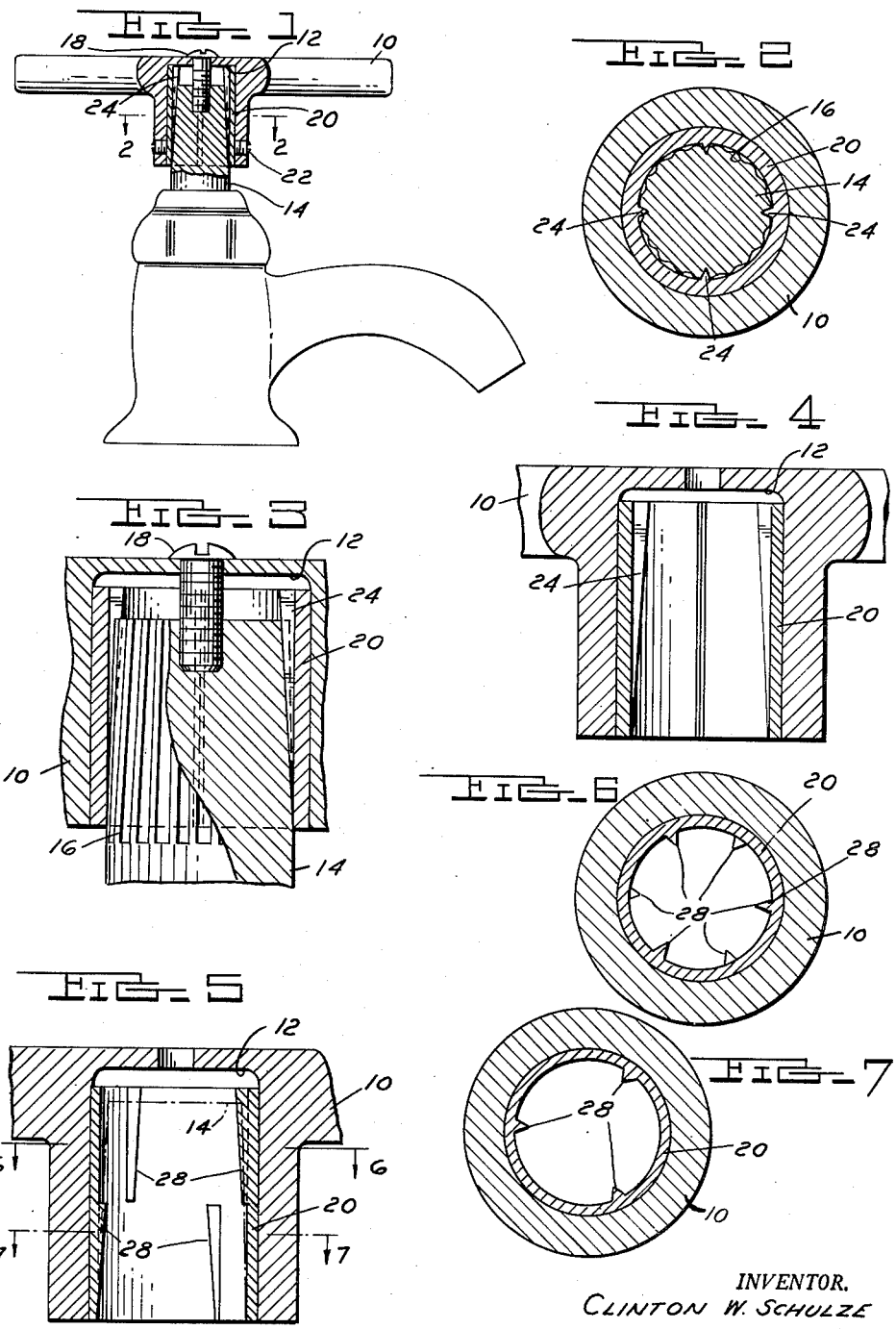

2,761,713

REPLACEABLE FAUCET HANDLE

Clinton W. Schulze, Detroit, Mich.

Application January 13, 1953, Serial No. 331,011

2 Claims. (Cl. 287—53)

This invention relates to an improved faucet handle.

An object is the provision of a faucet handle designed for ready replacement on a faucet stem to take the place of a faucet handle the connection of which with the stem is no longer satisfactory. My improved faucet handle is also suitable for initial installation upon a new faucet stem, if such is desired.

The primary object of the invention is the provision of a faucet handle which may be readily installed upon a stem and form a secure connection therewith so that the stem will rotate with the handle and the handle will retain its connection with the stem throughout long periods of use and wherein the construction is such that the attachment of the handle to the stem may be readily accomplished without the employment of special tools or the like.

The construction is such that my improved faucet handle may be secured to a stem which may be badly worn and the handle will form a secure connection with the stem to rotate the stem.

A meritorious feature of the construction is that my improved faucet handle is so designed that it may readily be secured upon the stem by a householder and does not necessitate the services of a plumber to make the attachment. More particularly, the socket of the faucet handle which receives the stem, whether the handle is of the single or the multiple lever type, is provided with a liner fitted with a plurality of elongated, inwardly radially extending projections, each of which is wedge shaped in cross section and is provided with a sharp cutting edge adapted to cut grooves in the stem as the handle is urged thereupon and to thereby effect a secure and positive connection between the handle and the stem.

Other objects, advantages and meritorious features will more fully appear from the following description, claims and accompanying drawing, wherein:

Fig. 1 is an elevation partly in section of a faucet construction embodying the invention;

Fig. 2 is a cross sectional view taken on the line 2—2 of Fig. 1;

Fig. 3 is a vertical sectional view through the socket portion of a faucet handle showing the stem received therein;

Fig. 4 is a view similar to Fig. 3 but not showing the stem received within the socket;

Fig. 5 is a sectional view taken on substantially the same line as that of Fig. 4 but showing a modified form of the construction;

Fig. 6 is a horizontal sectional view taken on line 6—6 of Fig. 5; and

Fig. 7 is a horizontal sectional view taken on line 7—7 of Fig. 5.

In the drawing, the handle is indicated by the numeral 10. Such handle is shown in Figs. 1, 4 and 5 as being of the cross type, but it is apparent that the single lever type of handle is equally adapted to the embodiment of the invention. Such handle, whether of the cross type shown, or of the single lever type, is provided with a socket or recess indicated by the numeral 12 and adapted to receive the end of a valve stem. Such stem is indicated by the numeral as being of conventional form. Such stem tapers toward its end and is provided with a plurality of corrugations 16. It is what is commonly called a knurled stem. It is conventional practice to provide a screw 18 which extends through the bottom of the socket in the handle into the end of the stem to draw the stem to its seat within the socket. The knurled portion of the stem is presumed to form such a frictional grip with the inner surface of the socket as to assure the handle and stem rotating together as a unit.

In my improved invention I provide a hardened liner or sleeve of a generally cylindrical shape indicated by the numeral 20 which is received within the socket portion of the handle. It is seated therein to form a press fit so that it will rotate with the handle as a unit. Set screws 22 may be employed to hold the liner within the handle if such are desired, though in practice it has not been found necessary to use them. The material of which the handle is commonly formed is a soft, metallic composition material and I prefer to form the sleeve or liner of a hardened steel bushing.

This sleeve or liner I provide with a plurality of hardened projections 24 which extend generally parallel to the axis of the cylindrical liner and which project inwardly radially thereof as shown. Such projections 24 also taper from the inner end of the liner toward the outer end thereof and are provided with a sharp cutting knife. In a faucet handle of ordinary construction, such as are used on water faucets in bathrooms or the like, the taper may be from a projection at the inner end of a liner of a 32nd of an inch to zero which is at the outer end of the liner. The inner end of the liner is that which seats adjacent to the bottom of the socket.

This faucet handle is particularly designed for replacement and attachment by the user. The faucet stem is commonly knurled as at 16, as heretofore stated. When the handle is inserted over the stem the projections 24 initially enter the corrugations 16 in the stem and are drawn down to a seat cutting their way into the socket as the handle is pushed completely down upon the stem. The hardened projections which are wedge shaped in cross section, as shown particularly in Figs. 2, 6 and 7, cut their way into the soft metal of the stem forming their own grooves therein and making a secure connection between the stem and the handle. The screw 18 is not shown in Fig. 4.

Figs. 5, 6 and 7 illustrate a modification which has certain advantages over the construction shown in the first four figures of the drawing. In the modification, two series of elongated projections are shown which are wedge shaped in cross section and are provided with a sharp cutting edge. The liner which is indicated in these figures by the numeral 20 as it is in the first four figures of the drawing, is here illustrated as provided with an inner series of elongated projections, three in number, indicated by the numeral 28. These splines are spaced circumferentially apart as heretofore described and project radially inwardly at their inner ends and taper toward their outer ends. The projection at the inner ends might be a 32nd of an inch and they might taper to a 64th of an inch at their outer ends.

Circumferentially offset from this inner series of projections is the outer series. This outer series of projections are similar in construction to the inner series except that at their inner ends which are adjacent the outer ends of the inner series they project radially inwardly to a distance of say a 64th and from that distance they taper to their outer ends substantially flush with the inner surface of the liner. The provision of two circumferentially offset series of projections, as shown in Figs. 5, 6 and 7, makes for a peculiarly secure attachment of the handle to the stem of the valve.

What I claim is:

1. A replacement faucet handle adapted to be mounted on a valve stem, said handle being provided with a cylindrical stem receiving recess, a plurality of elongated circumferentially spaced inwardly radially extending hardened projections on said handle in said recess, said projections being wedge shaped in cross section and being provided with cutting edges, said projections extending axially of said recess and being tapered from the inner end of the recess so that the edges diverge from the inner end of the recess toward the outer end thereof, each of said hardened projections being adapted to engage the outer surface of the valve stem on which said handle is mounted and to cut a groove therein to provide a secure and positive connection between the stem and the handle.

2. In a faucet having a valve stem provided with a replacement handle on one end thereof, said handle being provided with a stem receiving cylindrical recess, a hardened metal liner fixed within said recess, said liner being provided with a plurality of elongated circumferentially spaced inwardly radially extending hardened projections, said projections being wedge shaped in cross section and being provided with cutting edges, said projections extending axially of said recess and being tapered from the inner end of the recess so that the edges diverge from the inner end of the recess toward the outer end thereof, each of said hardened projections being adapted to engage the outer surface of the valve stem on which said handle is mounted and to cut a groove therein to provide a secure and positive connection between the stem and the handle, said liner and projections being of a harder material than said valve stem so that the projections will cut into the stem without being sheared off the liner when the handle is assembled on said stem.

References Cited in the file of this patent

UNITED STATES PATENTS

| | | |
|---|---|---|
| 1,741,588 | Schneider | Dec. 31, 1929 |
| 1,776,615 | Boothman et al. | Sept. 23, 1930 |
| 1,914,260 | Kennedy | June 13, 1933 |
| 1,929,708 | Morris | Oct. 10, 1933 |
| 1,992,901 | McIntosh | Feb. 26, 1935 |
| 2,544,304 | Eckenbeck et al. | Mar. 6, 1951 |

FOREIGN PATENTS

| | | |
|---|---|---|
| 16,653 | Great Britain | of 1908 |
| 965,381 | France | Feb. 15, 1950 |